Feb. 2, 1954     J. T. MULLIN     2,668,283
FREQUENCY COMPENSATION METHOD AND APPARATUS
Filed Aug. 20, 1951     2 Sheets-Sheet 1

INVENTOR.
JOHN T. MULLIN
BY Fulwider & Mattingly
Attorneys

Feb. 2, 1954 — J. T. MULLIN — 2,668,283

FREQUENCY COMPENSATION METHOD AND APPARATUS

Filed Aug. 20, 1951 — 2 Sheets-Sheet 2

Fig. 3

INVENTOR.
JOHN T. MULLIN
BY Fulwider & Mattingly
Attorneys

UNITED STATES PATENT OFFICE 2,668,283

FREQUENCY COMPENSATION METHOD AND APPARATUS

John T. Mullin, Los Angeles, Calif.

Application August 20, 1951, Serial No. 242,777

19 Claims. (Cl. 340—174)

1

This invention relates to a method and apparatus for compensating for undesired frequency variations in an electrical signal, and has particular reference to the compensation of such variations in a frequency-modulated signal representing intelligence transmitted by a telemetering system. The method and apparatus of this invention is particularly adapted to the compensation of frequency variations introduced into such a signal when the same is first recorded and later reproduced, the variations resulting from a difference in the speed of movement of the recording medium during recording and reproduction.

It has long been the practice to utilize changes in the frequency of an electrical signal as a means for electrically representing certain types of intelligence. To faithfully represent such intelligence, it is, of course, necessary that the frequency of the electrical signal be not affected by extraneous causes not related to the intelligence represented. Ordinarily, and particularly in those cases where the represented intelligence is perceived by preception of the qualitative changes in frequency, it has been possible to minimize the effect of unintended frequency variations. However, where such signals are utilized in a quantitative fashion, the precise intelligence being represented by the instantaneous frequency of the electrical signal, the effect of such unintended frequency variations has been sufficiently great to seriously impair the accuracy of the indicated results.

For example, in telemetering systems where it is required to transmit a number of different types of quantitative data from a remote transmitting point to a local receiving point, it has been the practice to use frequency modulation of an electrical signal as a means for representing such intelligence. In such systems, the magnitude of each individual item of data is indicated by measuring and appropriately indicating the deviation of the frequency of the electrical signal from a predetermined center frequency. If the frequency so measured has been varied by some external cause not related to the data represented, erroneous indications result.

In certain applications of telemetering systems, for example, where the data transmitted by the system is subject to rapid change or where the event to which the data relates is of short duration, it has been the practice to record the telemeter system signals as they are received, to thereby permit a later more leisurely and painstaking analysis of the data by reproduction of

2 the signals so recorded. When this practice is employed, an undesired frequency variation is introduced into the signal, because the speed of movement of the recording medium during reproduction is seldom, if ever, precisely the same as it was when the signal was recorded. Unfortunately, the error so introduced is not the same as the error represented by the difference between the two record speeds, but is many times that error. For example, if the difference in speeds amounts to one per cent, the error so caused will be of the order of magnitude of twenty per cent in a system where the total range between the minimum and the maximum values of the data is represented by a change in frequency from five per cent below to five per cent above the given center frequency.

Many attempts have been made in the past to eliminate the aforementioned source of error. Considerable effort has been expended in repeated attempts to provide better and better recording and reproducing devices, such attempts being directed to obtaining an absolutely constant speed of movement of the recording medium by the use of regulating systems for controlling the voltage of the operating power, the use of mechanical governing arrangements, the use of fly wheels and other high inertia mechanisms, and complicated speed regulating devices of various types. All of these expedients have failed to provide a complete solution to the problem, and although they have resulted in a reduction in the error introduced by speed variations, this reduction has been obtained only at great expense and by greatly increasing the complexity and cost of the recording and reproducing apparatus.

Another approach to the problem is represented by the apparatus disclosed in my copending application Serial No. 189,359, filed October 10, 1950, now abandoned, entitled "Negative Feedback System For Compensating Speed Variations in Sound Recording Media." In that system a pilot signal of constant known frequency is recorded simultaneously with the incoming telemeter signals. Speed differences between recording and reproduction appear as a frequency modulation of the reproduced pilot signal. This frequency modulation is detected and utilized to control a governing mechanism for effecting a compensating change in the speed of movement of the recording medium during the reproducing operation.

While the system disclosed in my aforementioned copending application provides a great improvement in the accuracy with which the reproduced signals represent the original data, the system nevertheless embodies certain disadvantages. In the first place, the control range is somewhat limited, requiring the use of a recording and reproducing apparatus of high inherent speed stability, such apparatus being somewhat more complicated, costly, and bulky than recording and reproducing apparatus of lower stability. Also, since the system operates to effect the compensation desired by actually changing the speed of movement of the recording medium past the reproducer pickup, there is an inherent time lag between the change in speed and the correction therefor. Thus, whenever the rate of change of relative speeds is comparable to the response speed of the system, the system fails to effect a complete compensation.

It is therefore an object of this invention to provide a method and apparatus for compensating for undesired frequency variations in an electrical signal, which method and apparatus overcome the above-mentioned disadvantages by direct manipulation of the signal as distinguished from the older practice of manipulating the signal source.

It is another object of this invention to provide a method and apparatus of the character set forth in the preceding paragraph in which a pilot signal having a frequency variation corresponding to the undesired frequency variations of the electrical signal is utilized for determining the amount of compensation required.

It is also an object of this invention to provide a method and apparatus of the character set forth hereinbefore in which the frequency variations in the pilot signal are detected and utilized to produce a related correction signal which is in turn applied in compensating relation to the electrical signal to thereby substantially eliminate the undesired frequency variations in said electrical signal.

It is an additional object of this invention to provide a method and apparatus of the character set forth in the preceding paragraphs wherein the pilot signal has a frequency different from that of the electrical signal to be compensated, wherein said pilot signal is separated from the electrical signal and converted to substantial equality with the center frequency of the electrical signal, and wherein the frequency of the converted pilot signal is compared with a locally generated frequency substantially equal to said center frequency to obtain the aforementioned correction signal.

It is a still further object of this invention to provide a method and apparatus of the character set forth in the preceding paragraph in which the locally generated frequency comprises the difference in frequency between two locally generated carrier signals, one of which is modulated by the converted pilot signal, and the other of which is modulated by the electrical signal to be compensated, thus producing two other high-frequency signals, and wherein the lower of said high-frequency signals is used to modulate the higher of said high-frequency signals to thereby produce as the lower sideband product of said modulation a corrected output signal having the desired frequency modulation components representing the data transmitted by said electrical signal, but substantially free of the undesired frequency variations.

Other objects and advantages of this invention will be apparent from a consideration of the following specification, read in connection with the accompanying drawings, wherein.

Figure 1:
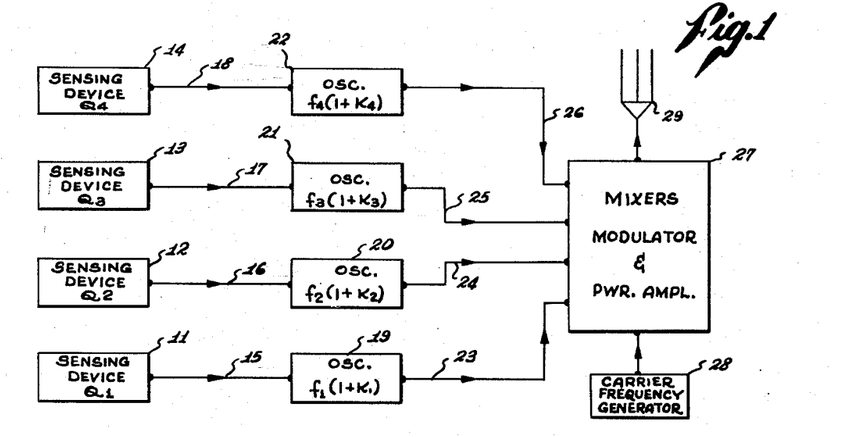
Fig. 1 is a block diagram representing the apparatus employed at the transmitting station of one well-known type of telemetering system and serving to produce electrical signals containing frequency modulation components representative of intelligence transmitted by the telemetering system.

Referring to the drawings, there is illustrated diagrammatically in Fig. 1 the apparatus comprising the transmitting station of a well-known form of telemetering system. It will be understood that there is utilized at such a transmitting station a plurality of sensing devices serving to detect the physical phenomenon producing the intelligence to be conveyed and serving also to measure or otherwise evaluate such intelligence. For example, the sensing devices may be utilized to detect and measure such physical quantities as pressure, temperature, velocity, acceleration, light intensity or the like.

While a relatively large number of such sensing devices may be utilized in any particular telemetering system, I have chosen for illustration in this application a system utilizing four sensing devices 11, 12, 13, and 14. The sensing devices 11–14 are coupled as indicated at 15, 16, 17, and 18 to associated signaling devices 19, 20, 21, and 22.

The signaling devices 19–22 may comprise variable frequency oscillators normally operating to produce an alternating electrical signal of a given frequency hereinafter referred to as the given center frequency. The oscillator frequency may be varied above or below the center frequency within given limits by the action of the sensing device coupled to the oscillator. This coupling is arranged to produce a change in the frequency of the signal generated by the oscillator which is proportional to the change in the quantity measured by the sensing device. This relation may be expressed mathematically as follows:

$$Q = Cf(1+K) \qquad (1)$$

where $Q$ is the quantity measured by the sensing device, $C$ is a constant of proportionality, $f$ is the center frequency generated by the oscillator, and $K$ is the deviation factor. The deviation factor $K$ is defined by the equation $$Q/Q_x = K/K_x \qquad (2)$$

wherein $Q_x$ and $K_x$ represent the maximum magnitudes attainable by $Q$ and $K$, it being understood that the quantity $Q$ measured by the sensing device varies between lower and upper limits of $-Q_x$ and $+Q_x$, and that the coupling of the sensing device to the oscillator is arranged to cause a corresponding variation of K between lower and upper limits of from $-K_x$ to $+K_x$.

In telemetering systems of the character herein described where it is desired to record a relatively large number of separate channels upon a single sound track, it is necessary to keep $K_x$ relatively small in order to provide adequate frequency spacing between adjacent channels and to permit the requisite number of channels to be encompassed by the available frequency response range of the recording and reproducing apparatus. $K_x$ is ordinarily of the order of magnitude of 0.05—that is to say, the frequency generated by the oscillator is caused to vary plus or minus 5% by the maximum variation in the magnitude of the quantity measured by the sensing device.

In Fig. 1 the symbols Q, f, and K have been included in the rectangles representing the portions of the apparatus which are concerned with the corresponding parameters, the subscripts 1 to 4 being applied to the symbols to distinguish each of the four separate channels from the other. This subscript notation is preserved throughout.

The oscillators 19–22 are connected as indicated at 23, 24, 25, and 26 to an assembly of appropriate mixing devices and a modulating system represented generally by the rectangle 27 bearing the reference character 27. This apparatus is included between a carrier signal generator 28 and a suitable transmitting antenna 29 so as to impress the information signals generated by the oscillators 19–22 upon the carrier signal as a suitable modulation thereof, the modulated carrier signal being radiated by the antenna 29. It will be understood that the apparatus 27 includes also such power amplifiers as may be required to insure the radiation from the antenna 29 of an adequately strong signal. Substantially any type of modulation system may be employed.

Figure 2:
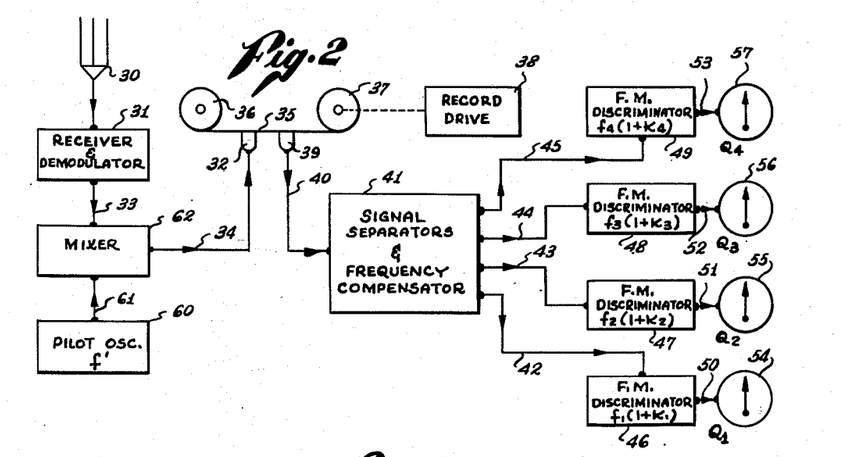
Fig. 2 is a block diagram illustrating the apparatus employed at a receiving station for receiving the signals transmitted from the transmitting station represented by Fig. 1, Fig. 2 illustrating the apparatus used to record and later reproduce the intelligence-bearing signals and illustrating diagrammatically also the manner in which the compensating device of my invention is utilized in connection with such a receiving and recording station.

The signals radiated by the transmitting antenna 29 are received and translated into a representation of the quantities Q1–Q4 by the apparatus which is illustrated in Fig. 2. The radio frequency signals from the transmitter are picked up by a receiving antenna 30 which is connected to a conventional radio receiver 31 which includes a suitable demodulator for producing in an output circuit the plurality of separate signals generated by the oscillators 19–22.

While Fig. 2 includes the apparatus forming the principal subject matter of this invention, it discloses also the apparatus heretofore used at such a receiving station prior to my invention. Believing that a ready understanding of this invention will be facilitated by an understanding of the older system, Fig. 2 will first be described with refererence to the systems used before this invention. According to such prior systems, the output signals from the receiver 31 were applied after suitable amplification to a recording head 32 in the manner represented by the lines 33 and 34. The recording head 32 forms a part of a recording and reproducing system which includes a moving recording medium 35.

In Fig. 2 the recording and reproducing apparatus is represented diagrammatically as comprising a magnetic tape recorder, the recording medium 35 constituting a conventional magnetic tape wound upon reels 36 and 37, one of which is arranged to be rotated by a record drive means 38.

By means of this apparatus, the information signals produced by the oscillators 19–22 are recorded on the moving recording medium 35 in superimposed fashion upon a single sound track, such recording of the signals being accomplished concurrently with their reception by the receiver 31.

When, at a later time, it is desired to translate the recorded signals into a representation of the quantities represented by those signals, the tape 35 is rewound and then moved past a playback or pickup head 39 to produce in an output circuit 40 signals corresponding to the original signals which were recorded on the recording medium. The reproduced output signals are applied to a group of signal separators or bandpass filters included within the apparatus represented by the rectangle 41, and the signals so separated are separately applied as indicated at 42, 43, 44, and 45 to associated frequency modulation discriminators 46, 47, 48, and 49.

The discriminators 46–49 may be of conventional construction and operate to compare the frequency of the applied signal with a predetermined frequency to produce in an output circuit a potential the magnitude and polarity of which is representative of the difference between the applied frequency and the given frequency. It will be seen that if the given comparison frequency is made equal to the center frequency of the oscillator originally generating the signal, the polarity and magnitude of the discriminator output will then represent the difference between such center frequency and the frequency actually generated by the oscillator. That is to say, the discriminator output may be represented as $$f(1+K)-f=fK \qquad (3)$$

The discriminator outputs are applied as indicated at 50, 51, 52, and 53 to suitable indicating devices 54, 55, 56, and 57. The indicating devices 54–57 may conveniently comprise zero center galvanometers for indicating both the magnitude and polarity of the discriminator output signal. The sensitivity of the galvanometer movement and the scale markings are so chosen as to give a direct indication of the magnitude of the quantity Q. With the galvanometer sensitivity and scale marking so selected, and recalling that the frequency modulation discriminator produces an output signal which is representative of the product $fK$, it is seen that the galvanometers 54–57 operate to in effect multiply the product $fK$ by an appropriate scale factor $(Q_x/fK_x)$. This operation may be mathematically represented as follows:

$$(fK)(Q_x/fK_x)=(K/K_x)Q_x \qquad (4)$$

From Equation 2 it is seen that $$(K/K_x)Q_x=Q \qquad (5)$$

The foregoing explanation of the operation of the systems used prior to this invention is valid only if the speed of movement of the recording medium 35 during the reproducing operation is at all times precisely equal to the speed of movement during recording. If there is a speed difference, this difference introduces a large error in the indicated result, as may be seen from the following analysis.

Let $d$ represent the proportional difference between the recording and reproducing record speed, thus:

$$d=\frac{N_p-N_r}{N_r} \qquad (6)$$

wherein $N_p$ represents the speed of movement of the recording medium during playback or reproduction, and $N_r$ represents the speed of movement of the recording medium during recording.

Since such a change in the record speed produces a proportional change in the frequency of the reproduced output signal, it will be seen that since the frequency of the original recorded signal is represented by $f(1+K)$, the frequency of the reproduced signal is given by $$S = f(1+K)(1+d) \qquad (7)$$

wherein S represents the frequency of the output signal produced by the pickup head 39 and applied to the frequency modulation discriminator.

The discriminator operates to subtract from the applied frequency represented by Equation 7 the given center frequency $f$, thus:

$$f(1+K)(1+d) - f = fK + fd(1+K) \qquad (8)$$

By comparing Equation 8 with Equation 3, it will be seen that the speed difference $d$ has changed the discriminator output by the last term of Equation 8. The result indicated by the galvanometer is determined by multiplying the result indicated by Equation 8 by the proportionality factor $(Q_x/fK_x)$ thus:

$$[fK + fd(1+K)](Q_x/fK_x)$$
$$= (K/K_x)Q_x + (Q_x/K_x)(1+K)d \qquad (9)$$

By observing from Equation 2 that $$(K/K_x)Q_x = Q \qquad (10)$$

and that $$(Q_x/K_x) = Q/K \qquad (11)$$

the indicated result given by Equation 9 may be reduced to:

$$\text{Indicated Result} = Q + Qd(1 + 1/K) \qquad (12)$$

Since the true value is represented by Q, it follows that the difference between the indicated and true values is:

$$\text{Difference} = Qd(1 + 1/K) \qquad (13)$$

The percentage error—that is, the ratio of the difference to the true value of the quantity, is obtained by dividing Equation 13 by the true value, Q, thus:

$$\text{Error} = [Qd(1 + 1/K)](1/Q)$$
$$= d(1 + 1/K) \qquad (14)$$

On the other hand, by comparing the original recorded signal frequency of $f(1+K)$ with the frequency of the reproduced signal given by Equation 7, it will be seen that the difference between these two frequencies is:

$$\text{Frequency Difference} = fd(1+K) \qquad (15)$$

and that the error in the frequency of the reproduced signal (obtained by dividing Equation 15 by the frequency of the original recorded signal) is the same as the speed error.

$$\text{Frequency Error} = fd(1+K)/f(1+K) = d \qquad (16)$$

Comparison of Equations 14 and 16 indicates that the frequency error produced by the difference in recording and reproducing speeds is multiplied in the indicated result. The amount by which the frequency error is multiplied (determined by dividing the error given by Equation 14 by that given by Equation 16) is $$d(1 + 1/K)(1/d) = 1 + 1/K \qquad (17)$$

It is apparent that no matter what may be the magnitude of $K_x$, the error in the indicated result in at least one-half of the scale range will always exceed the frequency error produced by the difference in the record speeds. In practice, $K_x$ is given a relatively small value, for example in the range from 0.05 to 0.10. If the smaller figure be substituted for K in Equation 17, it will be seen that the signal frequency error is multiplied by a factor of twenty-one in the indicated value of $K_x$—that is, the error in the indicated value of $Q_x$ is twenty-one times the proportional difference in the speeds of the recording medium between recording and reproducing. This indicates the difficulty of attempting to hold the recording and reproducing speeds to such close values as to reduce to a satisfactorily low value the resulting error in the indicated result.

According to the present invention, the error in the result is minimized by direct manipulation of the frequency of the reproduced output signals derived from the recording and reproducing apparatus, using a pilot signal of known frequency recorded simultaneously with the recording of the information signals as a means for determining the magnitude of the speed variations. This is accomplished, as is shown in Fig. 2, by the employment of a pilot oscillator 60 which generates a pilot signal of known fixed frequency $f'$ selected to lie in a vacant part of the available frequency spectrum. The output of the pilot oscillator 60 is applied as indicated at 61 to one input circuit of a suitable mixer 62, the other input to the mixer 62 comprising the output from the receiver 31 as indicated at 33, the mixer output being applied as indicated at 34 to the recording head 32 so as to superimpose upon all of the signals derived from the receiver 31 the pilot signal $f'$ produced by the oscillator 60.

In Fig. 2 the frequency compensating apparatus is considered as being associated with the signal separators and included within the apparatus indicated by the rectangle bearing the reference character 41. As will be made clear in connection with the detailed description of the apparatus illustrated in Fig. 3, the frequency compensator operates to subtract from the frequency of each of the reproduced output signals a correction frequency equal to the product of the corresponding given center frequency by the proportional difference in recording and reproducing speeds, thus:

$$S - fd = f(1+K)(1+d) - fd =$$
$$f(1+K) + fKd \qquad (18)$$

This signal is applied to the frequency modulation discriminator which, as previously explained, operates to produce an output signal representative of the difference between the frequency indicated by Equation 18 and the given center frequency $f$:

$$f(1+K) + fKd - f = fK(1+d) \qquad (19)$$

Recalling that the galvanometer sensitivity and scale marking have been selected so as to in effect multiply the frequency represented by the discriminator output by the proportionality factor $(Q_x/fK_x)$, and noting the realtion between K and Q as given by Equation 10, it will be seen that the value of Q indicated by the galvanometer may be determined thus:

$$fK(1+d)(Q_x/fK_x) = Q(1+d) \qquad (20)$$

The difference between the indicated value of Q and the true value of Q is $$Q(1+d) - Q = Qd \qquad (21)$$

and the error in the indicated result is $$Qd/Q = d \qquad (22)$$

Thus, the error in the indicated result has been reduced from the value indicated by Equation 14 to the same error see Equation 16 as the frequency error which is in turn the same as the proportional difference in the record speeds. The compensating apparatus of this invention thus operates to eliminate the error-magnifying factor $(1+1/K)$ given by Equation 17.

Considering the numerical example previously stated wherein $K_x$ was assumed to have a value of 5% and $d$ was assumed to have a value of 1%, it will be seen that this invention reduces the error in the indicated value of $Q_x$ by a factor of twenty-one from 21% to 1%. These results are compared in Table I following for a specific numerical case wherein the given center frequency $f$ is taken as 3000 cycles per second, the speed variation $d$ is taken as 1%, and $K_x$ is taken as 0.05, corresponding to a full-scale deflection of the indicating meter:

Table I

|     |     | Signal Frequency | | |
| --- | --- | --- | --- | --- |
|     |     | Recorded | Reproduced | |
|     |     |     | Not Comp. | Compensated |
| (a) | $K=K_x=+0.05$ | 3150.0 | 3181.5 | 3151.5 |
| (b) | $K=K_x=0.00$ | 3000.0 | 3030.0 | 3000.0 |
| (c) | $K=K_x=-0.05$ | 2850.0 | 2878.5 | 1838.5 |

|     | Deviation From ($f$) | | | Indication Error (percent of full scale) | |
| --- | --- | --- | --- | --- | --- |
|     | Recorded | Reproduced | | | |
|     |     | Not Comp. | Compensated | Not Comp. | Compensated |
| (a) | +150.0 | +181.5 | +151.5 | +21% | +1% |
| (b) | 0.0 | +30.0 | 0.0 | +20% | 0 |
| (c) | −150.0 | −121.5 | −151.5 | +19% | −1% |

Figure 3:
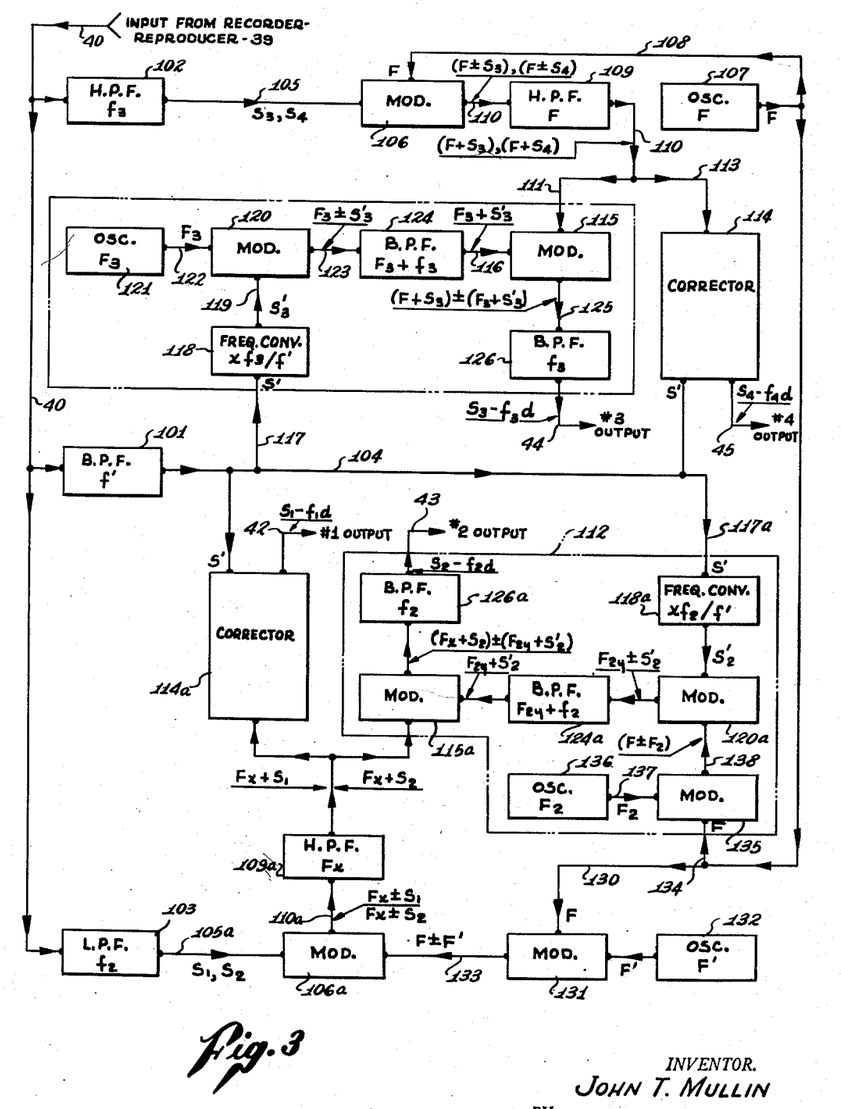
Fig. 3 is a block diagram illustrating diagrammatically the apparatus and mode of operation of the frequency compensating device of my invention.

The construction and mode of operation of the frequency compensating apparatus is shown in Fig. 3 of the drawings, wherein is illustrated in detail the apparatus represented generally in Fig. 2 by the rectangle bearing the reference character 41. As is shown in Fig. 3, the output signals produced by the reproducing head 39 are applied by the input conductor 40 to a plurality of signal separators which may comprise electrical filters 101, 102, and 103. The filter 101 is preferably given a bandpass characteristic tuned to the frequency $f'$ of the pilot signal, and serves to separate the reproduced pilot signal from the other reproduced signals. The output from the filter 101 is applied to a reference bus 104 to which other parts of the apparatus are connected, as will be described.

The filters 102 and 103 serve to segregate partially the information signals. While separate and individual filters of the bandpass type tuned to the individual frequency bands to be separated may be used, it is preferred to divide the entire frequency spectrum into portions each embracing a limited group of information signal frequencies. Thus, for example, the filter 102 may be given a high pass characteristic designed to pass without appreciable attenuation signals having a frequency of the order of magnitude of $f_3$ and higher, whereas the filter 103 may be given a low pass characteristic to pass without appreciable attenuation signals having frequencies of the order of magnitude of $f_2$ and lower, it being recognized that the filters 102 and 103 serve to reject and exclude frequencies lying outside of their pas characteristic.

Thus, in the form of the invention illustrated in this application, and according to the assumed example where four information signals are utilized, the filter 102 will operate to pass signals $S_3$ and $S_4$ falling within the two high-frequency channels of the spectrum utilized. These signals, it will be recalled, have a frequency which is different from the frequency of the corresponding signal originally recorded on the recording medium, the difference resulting from the difference in the speeds of movement of the recording medium during recording and reproduction. The frequencies of the signals $S_3$ and $S_4$ are defined by Equation 7, appropriate subscripts being applied to the quantities S, $f$, and K.

The signals $S_3$ and $S_4$ are applied as indicated at 105 to a modulator 106 which serves to modulate a first carrier or control signal having a frequency which may be designated F derived from a suitable oscillator 107 and delivered to the modulator 106 as indicated at 108. The modulator is an amplitude modulator and may be of any suitable type. A preference is expressed, however, for the balanced bridge or ring type modulator which operates to suppress the carrier frequency and deliver as products of the modulation upper and lower intermediate signals having the upper sideband frequency and the lower sideband frequency. These two frequencies, to wit $(F \pm S_3)$ and $(F \pm S_4)$, are delivered by the modulator 106 to a high pass filter 109 as indicated at 110. The filter 109 is adjusted to pass only frequencies greater than F, so that there appears in the output 110 thereof the two frequencies $(F+S_3)$ and $(F+S_4)$.

The output 110 is divided, one part being applied as indicated at 111 to a corrector illustrated by the apparatus enclosed within the dashed line marked 112, and operating to correct the frequency of the signal $S_3$, the other part of the output 110 being applied as indicated at 113 to a corrector 114 operating to correct the frequency of the signal $S_4$. It will be appreciated that both of the signals appearing in the output 110 are applied to both of the correctors 112 and 114, but these correctors operate to limit their respective outputs to the individual channels with which they are associated, and the ensuing description of the corrector 112 is therefore carried forward without reference to the signal $S_4$.

The divided output 111 is applied to a modulator 115 so as to be amplitude-modulated therein by a correction signal applied as indicated at 116. The correction signal is derived from the reproduced pilot signal S', and to this end the reference bus 104 is connected as indicated at 117 to a frequency converter 118 which serves to multiply the frequency S' of the reproduced pilot signal by a quantity equal to the ratio of the given center frequency $f_3$ to the pilot signal $f'$ so as to produce at its output 119 a converted pilot signal having a frequency equal to the center frequency of the reproduced information signal $S_3$—that is to say $$S'_3 = f_3(1+d) \tag{23}$$

The converted pilot signal is applied as indicated at 119 to a modulator 120 serving to amplitude-modulate a second carrier or control signal having a frequency $F_3$ produced by a suitable oscillator 121 and applied to the modulator 120 as indicated at 122. The modulator 120 is preferably of the ring type so as to deliver to its output 123 only the sideband products of said modulation, to wit, upper and lower reference signals having frequencies $(F_3 \pm S'_3)$.

The two sideband frequencies are applied to a filter 124 tuned to reject the lower sideband so as to deliver to the modulator 115 in the manner indicated at 116 only the upper sideband having a frequency $(F_3+S'_3)$. The signal so applied to the modulator 115 serves to amplitude-modulate the signal $(F+S_3)$, and is of the ring type so as to deliver to its output 125 only the sideband frequencies $(F+S_3) \pm (F_3+S'_3)$.

These sideband frequencies are applied to a bandpass filter 126 which is interposed between the modulator output 125 and the connection 44 leading to the frequency modulation discriminator 48 shown in Fig. 2. The filter 126 is tuned to pass only frequencies in the immediate vicinity of the given center frequency $f_3$, and so operates to pass only the lower sideband the frequency of which is $(F+S_3-F_3-S'_3)$.

The frequencies F and F₃ generated by the oscillators 107 and 121 are made materially higher than the highest signal frequency, and are selected so that the difference between the two frequencies F and F₃ is precisely equal to the given center frequency $f_3$. By rearranging the terms defining the upper sideband frequency delivered to the output 44, as $$\text{Upper Sideband} = F - F_3 + S_3 - S'_3 \quad (24)$$

and observing that $$F - F_3 = f_3 \quad (25)$$

and observing from Equation 23 that $$S'_3 = f_3 + f_3 d \quad (26)$$

it is seen that $$(F+S_3) - (F_3+S'_3) = S_3 f_3 d \quad (27)$$

From Equation 27 it is seen that the output signal which is delivered to the frequency modulation discriminator comprises the reproduced input signal S₃ after subtraction from the frequency thereof of a correction frequency $f_3 d$. This subtraction operates to compensate for the multiplication of the speed error in the manner already explained hereinbefore. The frequency modulation components $(f_3 K)$ carried by the signal S₃ and representing the transmitted intelligence are preserved throughout.

In the foregoing description it has been assumed that the frequency F is greater than the frequency F₃, but it will be observed that the relationship expressed in Equation 25 may be preserved even though the frequency F₃ be made the larger of the two frequencies. If the frequencies are thus selected, it is necessary to adjust the filter 109 to select the lower sideband instead of the upper and to similarly adjust the characteristics of the filter 124. In like manner, the connections to the modulator 115 must be interchanged so as to cause the lower of the two frequencies to amplitude-modulate the higher of the two. Expressed in more general terms, the filters 109 and 124 are adjusted to select from the two sideband frequencies applied to each that sideband which has a frequency differing from the frequency of its carrier signal in the same sense as the frequency F differs from the frequency F₃.

The corrector 114 is identical to the corrector 112 except for the change in the frequency characteristics of the apparatus to conform to the fourth channel by the subscript "4," and operates to produce at its output 45 a corrected signal having a frequency $S_4 - f_4 d$.

The signals S₁ and S₂ delivered by the low pass filter 103 are applied as indicated at 105a to a modulator 106a corresponding to the modulator 106 hereinbefore described. The apparatus associated with the modulator 106a is in general identical to that already described with reference to the compensation of signals S₃ and S₄ except for the adjustment of their frequency characteristics to correspond to the frequencies of the signals S₁ and S₂. To the extent that the apparatus is identical, the individual parts thereof bear the same reference characters as have been previously used with the suffix a added thereto, the corrector corresponding to the corrector 114, for example, being identified by the reference character 114a. The apparatus used for compensating signals S₁ and S₂ differs from that used for compensating signals S₃ and S₄ in that the two carrier frequencies utilized are derived in a somewhat different fashion. It will be appreciated that the apparatus requires filters which will discriminate between frequencies of the order of magnitude of F differing from each other by a small amount, of the order of magnitude $f$. Since the signals S₁ and S₂ are at the lower frequency portion of the frequency spectrum utilized, it will be seen that the filter problem becomes difficult if carrier signals of very high frequency are employed.

For this reason, the apparatus for compensating the signals S₁ and S₂ utilizes carrier signals of lower frequency, and means are provided for delivering these lower frequencies from the high-frequency oscillator 107 common to all of the compensating apparatus.

The carrier signal of frequency F generated by the oscillator 107 is applied as indicated at 130 to a modulator 131 which is supplied with an auxiliary signal having a frequency F' generated by an oscillator 132 so as to produce at its output 133 two sideband frequencies $(F \pm F')$. These two sideband frequencies are applied as the carrier signal to the modulator 106a to be modulated by the incoming information signals S₁ and S₂. Since there is a vast disparity between the frequencies $(F+F')$ and $(F-F')$, the higher of the two carrier frequencies may be rejected by tuning the internal circuits of the modulator 106a to the lower of the two frequencies so as to provide at the output 110a of the modulator 106a two pairs of sideband frequencies $(F_x \pm S_1)$ and $(F_x \pm S_2)$, the frequency $F_x$ being defined by $$F_x = F - F' \quad (28)$$

These signals are applied to the filter 109a and subsequently acted upon by the apparatus in the same manner as has been hereinbefore described with reference to the filter 109 and the input signals thereto having frequencies $(F \pm S_3)$ and $(F \pm S_4)$.

A somewhat similar arrangement is utilized for obtaining the second carrier frequency which is applied to the modulator 120a corresponding to the modulator 120 hereinbefore mentioned. The first carrier signal of frequency F is applied as indicated at 134 to a modulator 135, there to be amplitude-modulated by an auxiliary signal having a frequency F₂ generated by an oscillator 136 and applied to the modulator 135 as indicated at 137. The modulator 135 is also preferably of the ring type producing on its output 138 the two sidebands having frequencies of $(F \pm F_2)$. As was described with reference to the modulator 106a, the upper of these two sidebands may be excluded by appropriate tuning of the circuits of the modulator 120a so that the carrier frequency utilized by that modulator may be considered as $F_{2y}$, this frequency being defined as $$F_{2y} = F - F_2 \quad (29)$$

The modulated carrier signals $(F_x + S_2)$ and $(F_{2y} \pm S'_2)$ are handled by the devices 115a, 118a, 120a, 124a, and 126a of the corrector 112a in exactly the same fashion as the modulated carrier signals $(F + S_3)$ and $(F_3 \pm S'_3)$ are handled by the corresponding devices of the corrector 112. In order for the correction to be achieved so as to deliver to the output 43 the corrected signal $(S_2 - f_2 d)$, it is necessary for the difference between the two auxiliary carrier frequencies $F_x$ and $F_{2y}$ to satisfy the requirement $$F_x - F_{2y} = f_2 \quad (30)$$

From inspection of Equations 28, 29, and 30, it will be seen that this condition is satisfied by selecting the auxiliary carrier frequencies $F_2$ and $F'$ in accordance with the requirement $$F_2 - F' = f_2 \quad (31)$$

The frequency converters 118 hereinbefore referred to may comprise any suitable type of apparatus for performing the necessary conversion of the frequency of the pilot signal to frequencies corresponding to the given center frequencies of each of the information signals. This operation is conveniently performed, for example, by the use of a frequency divider such as a controlled or gated multivibrator circuit feeding an appropriate frequency multiplying circuit such as a non-linear amplifier stage followed by a selective circuit tuned to the desired output frequency, the multiplying and dividing factors of the circuit being chosen to produce an appropriate conversion of the frequency of the pilot signal to the desired given center frequency. To consider, for example, the numerical case set out as Table I, the required converted pilot signal frequency of 3000 C. P. S. might be derived, for example, from a pilot signal frequency of 52,500 C. P. S. by first dividing this latter frequency by five to produce an intermediate signal having a frequency of 10,500 C. P. S., multiplying that frequency by two to secure a frequency of 21,000 C. P. S., and then dividing that frequency by seven to produce the desired converted pilot frequency of 3000 C. P. S.

It has thus far been assumed that the pilot signal frequency bears such a relation to each given center frequency as to permit converted pilot signals to be derived having frequencies precisely equal to each given center frequency. While this is possible in any case, it may be that the frequency relationship between the given center frequency of one channel and the pilot signal frequency is such that a precise conversion cannot be obtained without the use of a large number of frequency multipliers and dividers. In such a case, one may so select the constants of the frequency converter 118 so as to produce a converted pilot signal having a frequency which closely approaches but is not precisely equal to the given center frequency. For example, the pilot signal frequency may be 48,100 C. P. S. To secure a converted pilot frequency equal to a given center frequency of 3000 C. P. S., it would be necessary to divide the pilot frequency by 16.03. Because of the difficulty of arranging frequency multipliers and dividers to provide such a divisor, we may conveniently divide sixteen, using two dividers, each dividing its input frequency by four. In such case, the converted pilot frequency $S'_3$ would be 3006.25 cycles per second. To determine the degree of compensation resulting from such a choice, one would substitute the converted pilot frequency $S'_3$ for the given center frequency $f_3$ in the expression $(S_3 - f_3 d)$ for the compensated output signal. Table II indicates the results achieved in the assumed numerical example.

Table II

| | | Signal Frequency | | |
|---|---|---|---|---|
| | | Recorded | Reproduced | |
| | | | Not Comp. | Compensated |
| (a) | $K = K_x = +0.05$ | 3150.0 | 3181.5 | 3145.2 |
| (b) | $K = K_x = 0.00$ | 3000.0 | 3030.0 | 2993.7 |
| (c) | $K = K_x = -0.05$ | 2850.0 | 2878.5 | 2842.2 |

| | Deviation From (f) | | | Indication Error (percent of full scale) | |
|---|---|---|---|---|---|
| | Recorded | Reproduced | | Not Comp. | Compensated |
| | | Not Comp. | Compensated | | |
| (a) | +150.0 | +181.5 | +145.2 | +21% | -3% |
| (b) | 0.0 | +30.0 | -6.3 | +20% | -4% |
| (c) | -150.0 | -121.5 | -157.8 | +19% | -5% |

From Table II it will be seen that while the magnification of the speed error is not entirely eliminated, the error in the indicated result is reduced to about ⅕ of its value in the absence of the compensation.

From the foregoing it will be seen that the accuracy of the results achieved by the apparatus of this invention depends in large part upon the accuracy of the pilot signal frequency and the accuracy of the frequencies produced by the carrier frequency oscillators. Because of the extremely high stability of relatively simple crystal controlled oscillators, it is possible to achieve the required accuracy of these frequencies without difficulty.

The accuracy of the results achieved also depends upon the accuracy of the difference in the frequencies of the two carrier signals, such as the frequency $F$ and the frequency $F_3$ generated by the oscillators 107 and 121, and upon the accuracy with which this frequency difference corresponds to the given center frequency of the signal to be compensated. Where this frequency difference is relatively small and the carrier signal frequencies are relatively high, some difficulty may be encountered in obtaining crystals ground to the required frequencies. In such a case, one may substitute for the oscillator 121 an arrangement such as is illustrated in Fig. 4.

Figure 4:
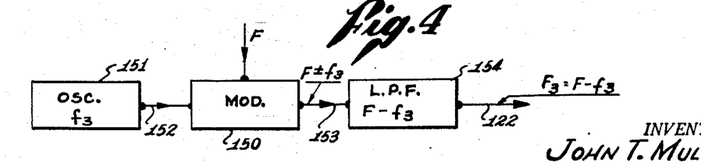
Fig. 4 is a block diagram illustrating a modified form of signal generator which may be used with the apparatus represented in Fig. 3.

In the apparatus shown in Fig. 4, the carrier frequency $F$ generated by the oscillator 107 is applied to a ring modulator 150 to be amplitude-modulated by a modulating signal having a frequency $f_3$ equal to the given center frequency derived from an auxiliary oscillator 151 and applied to the modulator 150 as indicated at 152. From the two sidebands $(F \pm f_3)$ delivered by the modulator 150 to its output 153, the lower sideband $F - f_3$ may be selected by means of a suitable low pass filter 154. The output from the filter 154 is applied to the conductor 122 shown in Fig. 3. This output has a frequency $F-f_3$ which, it will be seen, meets the requirements of differing from the first carrier frequency F by an amount equal to the given center frequency $f_3$.

With the arrangement shown in Fig. 4, the required accuracy and stability of the frequency difference may be readily achieved through the use of any of a number of well-known stable low frequency oscillator circuits for the oscillator 151, crystal control not being required.

From the foregoing it will be seen that this invention provides a method and apparatus for compensating for the frequency variations in an output signal which is accompanied by a pilot signal exhibiting corresponding variations in frequency. In particular it will be seen that the compensating apparatus and method illustrated and described in the foregoing serves to eliminate the extreme magnification of the error introduced by such frequency variations when a frequency modulation system is employed for indicating variations in the value of a measured quantity, the magnitude of which is represented by the deviation of the frequency of the information signal from the given center frequency thereof. Attention is directed particularly to the fact that the compensating apparatus and the method of this invention are particularly adapted to the compensation of errors introduced into the indicated results by the recording of the information signals and their analysis upon later reproduction of the recorded signals.

By the use of this invention, the indicated error may be reduced to a small fraction of the error resulting if the speed variations are not compensated. This materially reduces the stringency of the conditions which must be met by the recording and reproducing apparatus. Since in most cases an overall error of from 2% to 5% can be tolerated in the indicated results, a relatively inexpensive and simple recording apparatus may be utilized, whereas without the compensating apparatus disclosed herein, comparable accuracy could be obtained only by using an expensive and complicated recording apparatus capable of holding the recording and reproducing speed the same to within from ¼ to ⅒ of one per cent.

Attention is also directed to the fact that the various parts of the apparatus employed in this invention are each individually of simple, inexpensive and well-known construction allowing a complete compensating apparatus to be readily manufactured at low cost using tried and proven components capable of giving long and trouble-free service.

While the preferred embodiment of this invention has been illustrated and described herein, the invention is not to be limited to the details of construction shown and described, except as defined in the appended claims.

I claim:

1. In a device for compensating for undesired frequency variations in an output signal having a frequency normally bearing a predetermined relation to a given frequency and accompanied by a pilot signal of another frequency exhibiting frequency variations corresponding to said undesired frequency variations, the combination of: a frequency converter adapted to receive said pilot signal for multiplying said other frequency thereof by a factor substantially equal to the ratio of said given frequency to said other frequency and produce a converted pilot signal having a frequency substantially equal to said given frequency and including a variable frequency component representative of said frequency variations of said pilot signal; a signal generator for producing a control signal of fixed frequency; a signal combining means coupled to said generator and to said converter for combining said control signal and said converted pilot signal to produce a reference signal having a variable frequency component representative of said frequency variations of said pilot signal; and a signal comparing means coupled to said signal combining means and adapted also to receive said output signal for subtracting from the frequency of said output signal said variable frequency component of said reference signal to produce a corrected output signal substantially free of said undesired variations.

2. In a device for compensating for undesired frequency variations in an output signal normally comprising a signal of given center frequency carrying a frequency modulation component, said undesired frequency variations being in addition to said modulation component, said output signal being accompanied by a pilot signal of another frequency exhibiting frequency variations corresponding to said undesired frequency variations, the combination of: a frequency converter adapted to receive said pilot signal for multiplying said other frequency thereof by a factor substantially equal to the ratio of said given frequency to said other frequency and produce a converted pilot signal having a frequency substantially equal to said given frequency and including a variable frequency component representative of said frequency variations of said pilot signal; a first signal generator for producing a first control signal of fixed frequency; a first signal combining means coupled to said first generator and to said converter for combining said control signal and said converted pilot signal to produce a reference signal having a variable frequency component representative of said frequency variations of said pilot signal; a second signal generator for producing a second control signal of fixed frequency; a second signal combining means coupled to said second generator and adapted also to receive said output signal for combining said second control signal and said output signal to produce an intermediate signal having said frequency modulation component and having a variable frequency component corresponding to said undesired frequency variations; and a signal comparing coupled to said first and second signal combining means for subtracting from the frequency of said intermediate signal the frequency of said reference signal to produce a corrected output signal having said given center frequency and said modulation component, but substantially free of said undesired variations.

3. In a device for compensating for undesired frequency variations in an output signal normally comprising a signal of given center frequency carrying a frequency modulation component, said undesired frequency variations being in addition to said modulation component, said output signal being accompanied by a pilot signal of another frequency exhibiting frequency variations corresponding to said undesired frequency variations, the combination of: a frequency converter adapted to receive said pilot signal for multiplying said other frequency thereof by a factor substantially equal to the ratio of said given frequency to said other frequency and produce a converted pilot signal having a frequency substantially equal to said given frequency and including a variable frequency component representative of said frequency variations of said pilot signal; a first signal generator for producing a first carrier signal of fixed frequency; a first modulator coupled to said first generator and to said converter for amplitude-modulating said carrier signal with said converted pilot signal to produce a reference signal having a variable frequency component representative of said frequency variations of said pilot signal; a second signal generator for producing a second carrier signal of fixed frequency; a second modulator coupled to said second generator and adapted also to receive said output signal for amplitude-modulating said second carrier signal with said output signal to produce an intermediate signal having said frequency modulation component and having a variable frequency component corresponding to said undesired frequency variations; and a signal comparing means coupled to said first and second modulators for subtracting from the frequency of said intermediate signal the frequency of said reference signal to produce a corrected output signal having said given center frequency and said modulation component, but substantially free of said undesired variations.

4. In a device for compensating for undesired frequency variations in an output signal normally comprising a signal of given center frequency carrying a frequency modulation component, said undesired frequency variations being in addition to said modulation component, said output signal being accompanied by a pilot signal of another frequency exhibiting frequency variations corresponding to said undesired frequency variations, the combination of: a frequency converter adapted to receive said pilot signal for multiplying said other frequency thereof by a factor substantially equal to the ratio of said given frequency to said other frequency and produce a converted pilot signal having a frequency substantially equal to said given frequency and including a variable frequency component representative of said frequency variations of said pilot signal; a first signal generator for producing a first carrier signal of fixed frequency; a first modulator coupled to said first generator and to said converter for modulating said carrier signal with said converted pilot signal to produce upper and lower reference signals comprising upper and lower sideband products of said modulation, said reference signals each having a variable frequency component representative of said frequency variations of said pilot signal; a second signal generator for producing a second carrier signal having a second fixed frequency differing from said first fixed frequency by an amount equal to said given center frequency; a second modulator coupled to said second generator and adapted also to receive said output signal for amplitude-modulating said second carrier signal with said output signal to produce upper and lower intermediate signals comprising upper and lower sideband products of said modulation, said intermediate signals each having said frequency modulation component and each having a variable frequency component corresponding to said undesired frequency variations; a pair of signal separators coupled respectively to said first and second modulators for separating respectively from said upper and lower reference signals and from said upper and lower intermediate signals those signals which have frequencies differing from the frequencies of their carrier signals in the same sense as said second fixed frequency differs from said first fixed frequency to thereby provide a pair of high-frequency signals; and a third modulator coupled to said signal separators for amplitude-modulating the higher of said high-frequency signals by the lower of said high-frequency signals to produce as a sideband product of said modulation a corrected output signal having said given center frequency and said modulation component, but substantially free of said undesired variations.

5. In a device for compensating for undesired frequency variations in an output signal having a frequency normally bearing a predetermined relation to a given frequency and accompanied by a pilot signal of another frequency exhibiting frequency variations corresponding to said undesired frequency variations, the combination of: a signal separator for receiving and separating said pilot signal and said output signal from each other; a frequency converter coupled to said signal separator to receive said pilot signal therefrom for multiplying said other frequency thereof by a factor substantially equal to the ratio of said given frequency to said other frequency and produce a converted pilot signal having a frequency substantially equal to said given frequency and including a variable frequency component representative of said frequency variations of said pilot signal; a signal generator for producing a control signal of fixed frequency; a signal combining means coupled to said generator and to said converter for combining said control signal and said converted pilot signal to produce a reference signal having a variable frequency component representative of said frequency variations of said pilot signal; and a signal comparing means coupled to said signal combining means and coupled to said signal separator to receive said output signal therefrom for subtracting from the frequency of said output signal said variable frequency component of said reference signal to produce a corrected output signal substantially free of said undesired variations.

6. In a device for compensating for undesired frequency variations in an output signal normally comprising a signal of given center frequency carrying a frequency modulation component, said undesired frequency variations being in addition to said modulation component, said output signal being accompanied by a pilot signal of another frequency exhibiting frequency variations corresponding to said undesired frequency variations, the combination of: a signal separator for receiving and separating said pilot signal and said output signal from each other; a frequency converter coupled to said signal separator to receive said pilot signal for multiplying said other frequency thereof by a factor substantially equal to the ratio of said given frequency to said other frequency and produce a converted pilot signal having a frequency substantially equal to said given frequency and including a variable frequency component representative of said frequency variations of said pilot signal; a first signal generator for producing a first control signal of fixed frequency; a first signal combining means coupled to said first generator and to said converter for combining said first control signal and said converted pilot signal to produce a reference signal having a variable frequency component representative of said frequency variations of said pilot signal; a second signal generator for producing a second control signal of fixed frequency; a second signal combining means coupled to said second generator and coupled to said signal separator to receive therefrom said output signal for combining said second control signal and said output signal to produce an intermediate signal having said frequency modulation component and having a variable frequency component corresponding to said undesired frequency variations; and a signal comparing means coupled to said first and second signal combining means for subtracting from the frequency of said intermediate signal the frequency of said reference signal to produce a corrected output signal having said given center frequency and said modulation component, but substantially free of said undesired variations.

7. In a device for compensating for undesired frequency variations in an output signal normally comprising a signal of given center frequency carrying a frequency modulation component, said undesired frequency variations being in addition to said modulation component, said output signal being accompanied by a pilot signal of another frequency exhibiting frequency variations corresponding to said undesired frequency variations, the combination of: frequency-responsive means for receiving and separating said pilot signal and said output signal from each other; a frequency converter coupled to said frequency responsive means to receive said pilot signal therefrom for multiplying said other frequency thereof by a factor substantially equal to the ratio of said given frequency to said other frequency and produce a converted pilot signal having a frequency substantially equal to said given frequency and including a variable frequency component representative of said frequency variations of said pilot signal; a first signal generator for producing a first carrier signal of fixed frequency; a first modulator coupled to said first generator and to said converter for modulating said carrier signal with said converted pilot signal to produce upper and lower reference signals comprising upper and lower sideband products of said modulation, said reference signals each having a variable frequency component representative of said frequency variations of said pilot signal; a second signal generator for producing a second carrier signal having a second fixed frequency differing from said first fixed frequency by an amount equal to said given center frequency; a second modulator coupled to said second generator and coupled to said frequency responsive means to receive said output signal for amplitude-modulating said second carrier signal with said output signal to produce upper and lower intermediate signals comprising upper and lower sideband products of said modulation, said intermediate signals each having said frequency modulation component and each having a variable frequency component corresponding to said undesired frequency variations; a pair of signal separators coupled respectively to said first and second modulators for separating respectively from said upper and lower reference signals and from said upper and lower intermediate signals those signals which have frequencies differing from the frequencies of their carrier signals in the same sense as said second fixed frequency differs from said first fixed frequency to thereby provide a pair of high-frequency signals; a third modulator coupled to said signal separators for amplitude-modulating the higher of said high- frequency signals by the lower of said high-frequency signals; and a third signal separator coupled to said third modulator for separating from the products of said last-mentioned modulation the lower sideband thereof to provide a corrected output signal having said given center frequency and said modulation component, but substantially free of said undesired variations.

8. In a device for use with a recording and reproducing apparatus for compensating for frequency variations in an output signal of said apparatus derived by reproduction of an original signal recorded upon a moving recording medium and having a frequency normally deviating within given limits from a given center frequency, said output signal being accompanied by a pilot signal simultaneously reproduced from said recording medium and exhibiting corresponding frequency variations, said frequency variations resulting from a difference in the speed of movement of said recording medium during recording and reproduction, the combination of: a signal generator for producing a control signal of fixed frequency; a first signal combining means coupled to said generator and coupled also to said apparatus to receive therefrom said pilot signal for combining said control signal and said pilot signal to produce a reference signal having a variable frequency component representative of said frequency variations of said pilot signal; and a second signal combining means coupled to said first combining means and also coupled to said apparatus to receive therefrom said output signal for subtracting from the frequency of said output signal said variable frequency component of said reference signal to produce a corrected output signal substantially free of said undesired variations.

9. In a device for use with a recording and reproducing apparatus for compensating for frequency variations in an output signal of said apparatus derived by reproduction of an original signal recorded upon a moving recording medium and having a frequency normally deviating within given limits from a given center frequency, said output signal being accompanied by a pilot signal simultaneously reproduced from said recording medium and exhibiting corresponding frequency variations, said frequency variations resulting from a difference in the speed of movement of said recording medium during recording and reproduction, the combination of: frequency-responsive means coupled to said apparatus for receiving therefrom and for separating said pilot signal and said output signal from each other; a frequency converter coupled to said frequency-responsive means to receive therefrom said pilot signal for multiplying said other frequency thereof by a factor substantially equal to the ratio of said given frequency to said other frequency and produce a converted pilot signal having a frequency substantially equal to said given frequency and including a variable frequency component representative of said frequency variations of said pilot signal; a first signal generator for producing a first carrier signal of fixed frequency; a first modulator coupled to said first generator and to said converter for modulating said first carrier signal with said converted pilot signal to produce upper and lower reference signals comprising upper and lower sideband products of said modulation, said reference signals each having a variable frequency component representative of said frequency variations of said pilot signal; a second signal generator for producing a second carrier signal having a second fixed frequency differing from said first fixed frequency by an amount equal to said given center frequency; a second modulator coupled to said second generator and coupled to said frequency-responsive means to receive therefrom said output signal for amplitude-modulating said second carrier signal with said output signal to produce upper and lower intermediate signals comprising upper and lower sideband products of said modulation, said intermediate signals each having said frequency modulation component and each having a variable frequency component corresponding to said undesired frequency variations; a pair of signal separators coupled respectively to said first and second modulators for separating respectively from said upper and lower reference signals and from said upper and lower intermediate signals those signals which have frequencies differing from the frequencies of their carrier signals in the same sense as said second fixed frequency differs from said first fixed frequency to thereby provide a pair of high-frequency signals; a third modulator coupled to said signal separators for amplitude-modulating the higher of said high-frequency signals by the lower of said high-frequency signals; and a third signal separator coupled to said third modulator for separating from the products of said last-mentioned modulation the lower sideband thereof to provide a corrected output signal having said given center frequency and said modulation component, but substantially free of said undesired variations.

10. In a device for compensating for undesired frequency variations in an output signal having a frequency normally deviating within given limits from a given center frequency, wherein said undesired frequency variations result from a given cause, said output signal being accompanied by a pilot signal exhibiting corresponding variations in frequency resulting from said given cause and corresponding to said undesired variations in frequency of said output signal, the combination of: means for determining the magnitude of the variations in frequency of said pilot signal; means coacting with said first-named means for producing a correction signal having a frequency substantially equal to the product of said given center frequency and the ratio of said determined variations in frequency of said pilot signal to the frequency thereof; a further means coacting with said last-mentioned means combining said output signal with said correction signal; and means coacting with said further means for selecting that one of the signals so resulting which has a frequency equal to the difference between the frequency of said output signal and the frequency of said correction signal.

11. In a device for compensating for frequency variations in an output signal derived by reproduction of an original signal recorded upon a moving recording medium and resulting from a difference in the speed of movement of said recording medium during recording and reproduction, the combination of: means for continuously determining the magnitude of said difference in speed; means coacting with said first-named means for producing a correction signal having a frequency at all times substantially equal to the product of the frequency of said original signal and the ratio of said difference in speed to said speed during recording; a further means coacting with said last-mentioned means combining said output signal with said correction signal; and means coacting with said further means for selecting that one of the signals so resulting which has a frequency equal to the difference between the frequency of said output signal and the frequency of said correction signal.

12. In a device for compensating for frequency variations in an output signal derived by reproduction of an original signal recorded upon a moving recording medium and having a frequency normally deviating within given limits from a given center frequency, wherein said frequency variations result from a difference in the speed of movement of said recording medium during recording and reproduction, the combination of: means for continuously determining the magnitude of said difference in speed; means coacting with said first-named means for producing a correction signal having a frequency at all times substantially equal to the product of said given center frequency and the ratio of said difference in speed to said speed during recording; a further means coacting with said last-mentioned means combining said output signal with said correction signal; and means coacting with said further means for selecting that one of the signals so resulting which has a frequency equal to the difference between the frequency of said output signal and the frequency of said correction signal.

13. In a device for compensating for frequency variations in each of a plurality of output signals derived by reproduction of a plurality of original signals of different frequencies normally deviating within given limits from given center frequencies and recorded upon a moving recording medium, wherein said frequency variations result from a difference in the speed of movement of said recording medium during recording and reproduction, the combination of: means for continuously determining the magnitude of said difference in speed of recording medium; means for separating said output signals one from another; and means for correcting the frequency of each of said output signals including means for producing correction signals corresponding to said output signals and having frequencies at all times substantially equal to the product of each of said given center frequencies and the ratio of said difference in speed to said speed during recording, a further means coacting with said last-mentioned means combining each of said output signals with the corresponding one of said correction signals, and means coacting with said further means for selecting for each of said output signals that one of the signals resulting from the combining of said signals which has a frequency equal to the difference between the frequency of said output signal and the frequency of said corresponding correction signal.

14. In a device for compensating for undesired frequency variations in an output signal having a frequency normally deviating within given limits from a given center frequency, wherein said undesired frequency variations result from a given cause, the combination of: means for producing a pilot signal normally having a known frequency harmonically related to said given center frequency; means coacting with said first-named means for subjecting said pilot signal to the influence of said cause to produce variations in the frequency of said pilot signal corresponding to said undesired frequency variations in said output signal; a further means coacting with said last-mentioned means multiplying the frequency of said pilot signal by a factor equal to the ratio of said given center frequency to said normal known frequency of said pilot signal to thereby provide a reference frequency; means coacting with said further means for comparing said reference frequency with said given center frequency to determine the difference therebetween; and means coacting with said last means aforesaid for subtracting said difference from the frequency of said output signal.

15. In a device for compensating for undesired frequency variations in each of a plurality of output signals having frequencies normally deviating within given limits from corresponding given center frequencies, wherein said undesired frequency variations result from a given cause, the combination of: means for producing a pilot signal of known nominal frequency; means coacting with said first-named means for subjecting said pilot signal to the influence of said cause to produce variations in the frequency of said pilot signal corresponding to said undesired variations in each of said output signals; and means for correcting the frequency of each of said output signals including means for multiplying the frequency of said pilot signal by factors substantially equal to the ratios of each of said given center frequencies to said known nominal frequency to provide a reference frequency corresponding to each of said output signals, a further means coacting with said last-mentioned means comparing the reference frequency for each of said output signals with said given center frequency thereof to determine the difference therebetween, and means coacting with said further means for subtracting said differences from the frequencies of the corresponding output signals.

16. In a device for compensating for frequency variations in an output signal derived by reproduction of an original signal recorded upon a moving recording medium and having a frequency normally deviating within given limits from a given center frequency, wherein said variations in frequency result from a difference in the speed of movement of said recording medium during recording and reproduction, the combination of: means for recording simultaneously with the recording of said original signal a pilot signal having a frequency harmonically related to said given center frequency; means for reproducing said pilot signal simultaneously with the reproduction of said recorded original signal to produce said output signal; means coacting with said reproducing means for separating said reproduced pilot signal from said output signal; a further means coacting with said last-mentioned means multiplying the frequency of said reproduced pilot signal by a factor equal to the ratio of said given center frequency to the frequency of said pilot signal to provide a reference signal; means coacting with said further means for comparing the frequency of said reference signal with said known center frequency to secure a correction frequency; and means coacting with said last means aforesaid for subtracting said correction frequency from the frequency of said output signal.

17. In a device for compensating for frequency variations in a reproduced information signal derived by reproduction of an original information signal recorded upon a moving recording medium and having a frequency normally deviating within given limits from a given center frequency, wherein said frequency variations result from a difference in the speed of movement of said recording medium during recording and reproduction, the combination of: means for recording simultaneously with the recording of said original information signal a pilot signal having a frequency harmonically related to said given center frequency; means for reproducing said pilot signal simultaneously with the reproduction of said recorded original information signal to produce simultaneously with the production of said reproduced information signal a reproduced pilot signal; means coacting with said reproducing means for separating said reproduced pilot signal from said reproduced information signal; a further means coacting with said last-mentioned means subjecting said reproduced pilot signal to a frequency conversion to produce a reference signal having a frequency substantially equal to the center frequency of said reproduced information signal; means for producing a first carrier signal having a first known frequency; means for producing a second carrier signal having a second known frequency differing from said first known frequency by an amount equal to said given center frequency; means for modulating said first carrier signal with said reference signal; means coacting with said first-named means for modulating said second carrier signal with said reproduced information signal; means coacting with said modulating means for selecting from the products of each of said modulations that sideband which has a frequency differing from the frequency of its carrier signal in the same sense as said second known frequency differs from said first known frequency to thereby provide two high-frequency signals; means coacting with said selecting means modulating the higher of said high-frequency signals by the lower of said high-frequency signals; and means coacting with said last means aforesaid for selecting from the products of said last-mentioned modulation the lower sideband thereof.

18. In a device for compensating for frequency variations in each of a plurality of output signals derived by reproduction of a plurality of original signals recorded upon a moving recording medium and each having a frequency normally deviating within given limits from a corresponding given center frequency, wherein said frequency variations result from a difference in the speed of movement of said recording medium during recording and reproduction, the combination of: means for recording simultaneously with the recording of said original signals a pilot signal of a given nominal frequency; means for reproducing said recorded pilot signal simultaneously with the reproduction of said given original signals to produce said plurality of output signals; means coacting with said reproducing means for separating said reproduced pilot signal and said output signals one from the others; and means for correcting the frequency of each of said output signals including means for multiplying the frequency of said reproduced pilot signal by factors equal to the ratios of each of said given center frequencies to said given nominal frequency to provide a reference signal corresponding to each of said output signals, a further means coacting with said last-mentioned means comparing the frequency of each of said reference signals with the known center frequency of the output signal to which it corresponds to determine the difference therebetween, and means coacting with said further means for subtracting said difference from the frequency of the corresponding output signal.

19. In a device for compensating for undesired frequency variations in an output signal having a frequency normally deviating within given limits from a given center frequency, wherein said undesired frequency variations result from a given cause, the combination of: a plurality of interrelated cooperating means for producing a pilot signal normally having a known frequency harmonically related to said given center frequency, for subjecting said pilot signal to the influence of said cause to produce variations in the frequency of said pilot signal corresponding to said undesired frequency variations in said output signal, for multiplying the frequency of said pilot signal by a factor equal to the ratio of said given center frequency to said normal known frequency of said pilot signal to thereby provide a reference frequency, for comparing said reference frequency with said given center frequency to determine the difference therebetween, and for subtracting said difference from the frequency of said output signal.

JOHN T. MULLIN.

References Cited in the file of this patent

UNITED STATES PATENTS

| Number | Name | Date |
| --- | --- | --- |
| 2,039,404 | Green et al. | May 5, 1936 |
| 2,334,510 | Roberts | Nov. 16, 1943 |
| 2,421,771 | Browning | June 10, 1947 |
| 2,556,556 | Schmitt et al. | June 12, 1951 |